(12) United States Patent
Zhu et al.

(10) Patent No.: US 10,558,973 B2
(45) Date of Patent: Feb. 11, 2020

(54) METHOD AND APPARATUS FOR CARD ACTIVATION

(71) Applicant: Beijing Xiaomi Mobile Software Co., Ltd., Haidian District, Beijing (CN)

(72) Inventors: Yifan Zhu, Beijing (CN); Yang Chen, Beijing (CN); Lina Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 199 days.

(21) Appl. No.: 15/614,630

(22) Filed: Jun. 6, 2017

(65) Prior Publication Data
US 2017/0372295 A1    Dec. 28, 2017

(30) Foreign Application Priority Data

Jun. 23, 2016    (CN) .......................... 2016 1 0466532

(51) Int. Cl.
*G06Q 20/32*    (2012.01)
*G06Q 20/34*    (2012.01)
(Continued)

(52) U.S. Cl.
CPC ... *G06Q 20/3278* (2013.01); *G06K 19/07703* (2013.01); *G06Q 20/204* (2013.01);
(Continued)

(58) Field of Classification Search
CPC ............ G06Q 20/3278; G06Q 20/204; G06Q 20/222; G06Q 20/3227; G06Q 20/341;
(Continued)

(56) References Cited

U.S. PATENT DOCUMENTS

| 8,196,131 B1 | 6/2012 | von Behren et al. |
| 2011/0098023 A1 | 4/2011 | Hammad |
| 2013/0232083 A1 | 9/2013 | Smith et al. |

FOREIGN PATENT DOCUMENTS

| CA | 2865435 A1 | 9/2013 |
| CN | 202444629 | 9/2012 |

(Continued)

OTHER PUBLICATIONS

Sun, "The Java Card (TM) 3 Platform", Aug. 31, 2008 (Aug. 31, 2008), pp. 1-30, From the Internet: http://www.oracle.com/technetwork/articles/javase/javacard3-whitepaper-149761.pdf, retrieved on Oct. 13, 2017. (Year: 2008).*

(Continued)

*Primary Examiner* — Edward F Urban
*Assistant Examiner* — Angelica M Perez
(74) *Attorney, Agent, or Firm* — Jun He Law Offices P.C.; James J. Zhu

(57) ABSTRACT

Method and apparatus for card activation are provided, which belong to computer technology. The method is applied to an intelligent device having a secure element (SE) chip and includes: creating a first background thread during pre-activation operations using a user interface (UI) thread; obtaining a first part of data for the card activation from a server using the first background thread; writing the first part of data to the SE chip using the first background thread; creating a second background thread after the pre-activation operations have been accomplished using the UI thread and the card activation is confirmed; and writing a second part of data for the card activation to the SE chip using the second background thread.

11 Claims, 8 Drawing Sheets

(51) Int. Cl.
*G06K 19/077* (2006.01)
*G06Q 20/20* (2012.01)
*G06Q 20/40* (2012.01)

(52) U.S. Cl.
CPC ....... *G06Q 20/322* (2013.01); *G06Q 20/3227* (2013.01); *G06Q 20/341* (2013.01); *G06Q 20/352* (2013.01); *G06Q 20/3552* (2013.01); *G06Q 20/3567* (2013.01); *G06Q 20/40* (2013.01)

(58) Field of Classification Search
CPC ............ G06Q 20/352; G06Q 20/3552; G06Q 20/3567; G06Q 20/40; G06K 19/07703
USPC ............................................. 455/41.1–41.3
See application file for complete search history.

(56) References Cited

FOREIGN PATENT DOCUMENTS

| CN | 102929532 A | 2/2013 | | |
|---|---|---|---|---|
| CN | 104602224 | 5/2015 | | |
| CN | 105046486 | 11/2015 | | |
| CN | 105678618 A | 6/2016 | | |
| WO | WO-2013130982 A1 | * | 9/2013 | ......... G06Q 20/3278 |

OTHER PUBLICATIONS

Raja Naeem Akram et al, "Application Management Framework in User Centric Smart Card Ownership Model", Information Security Applications, Aug. 25, 2009 (Aug. 25, 2009), pp. 20-35, Springer Berlin Heidelberg, ISBN: 978-3-642-10837-2.

Sun, "The Java Card (TM) 3 Platform", Aug. 31, 2008 (Aug. 31, 2008), pp. 1-30, From the Internet: http://www.oracle.com/technetwork/articles/javase/javacard3-whitepaper-149761.pdf, retrieved on Oct. 13, 2017.

Calin Cascaval et al, "Concurrency in Mobile Browser Engines", IEEE Pervasive Computing (vol. 14, Issue 3, Jul.-Sep. 2015), Jun. 30, 2015 (Jun. 30, 2015), pp. 14-19, DOI: 10.1109/MPRV.2015.58, From the Internet: http://ieeexplore.ieee.org/document/7140678/, retrieved on Oct. 13, 2017.

Extended European Search Report for European Application No. 17171104.7, dated Oct. 26, 2017.

International Search Report of PCT/CN2016/098946.

* cited by examiner

METHOD AND APPARATUS FOR CARD ACTIVATION

CROSS-REFERENCE TO RELATED APPLICATION

This application bases on and claims priority to Chinese Patent Application No. 201610466532.3, filed Jun. 23, 2016, which is incorporated herein by reference in its entirety.

FIELD

The disclosure generally relates to computer technology, and more particularly to a method and apparatus for card activation.

BACKGROUND

With a rapid development of near field communication (NFC) technology and intelligent device, a card emulation function of a NFC device is increasingly mature in mobile payment and transport card.

A secure element (SE) on the NFC device has its own computing capability. In the card emulation, the NFC device writes card data, which is needed in the card emulation, in the SE by offline pre-configuration or card activation over network to achieve the card emulation function. Typically, writing the card data in the SE can be described as follows: there is a corresponding application (App) mounted on the NFC device; the NFC device need to perform a plurality of interaction operations with a server during the card activation by the App; when the interaction operations accomplished, the NFC device may obtain the data needed for the card activation from the server and write the obtained data in a SE chip one time. Because the interaction operations and the data writing both take a long time, it is time-consuming to active a card by the NFC device.

SUMMARY

Method and apparatus for card activation are provided in the disclosure.

According to a first aspect of the disclosure, there is provided a method for card activation, applied to an intelligent device having a secure element SE chip, the method comprising: creating a first background thread during pre-activation operations using a user interface (UI) thread; obtaining a first part of data for the card activation from a server using the first background thread; writing the first part of data to the SE chip using the first background thread; creating a second background thread after the pre-activation operations have been accomplished using the UI thread and the card activation is confirmed; and writing a second part of data for the card activation to the SE chip using the second background thread.

According to a second aspect of the disclosure, there is provided an apparatus for card activation, which is applied to an intelligent device having a secure element SE chip, the apparatus comprising: a processor; and a memory for storing instructions executable by the processor; wherein the processor is configured to: create a first background thread during pre-activation operations using a UI thread; obtain a first part of data for the card activation from a server using the first background thread; write the first part of data to the SE chip using the first background thread; create a second background thread after the pre-activation operations have been accomplished using the UI thread and the card activation is confirmed; and write a second part of data for the card activation to the SE chip using the second background thread.

According to a third aspect of the disclosure, there is provided an apparatus for card activation, applied to a server, the apparatus comprising: a processor; and a memory for storing instructions executable by the processor; wherein the processor is configured to: receive from an intelligent device a first request to obtain data; send a first part of data for the card activation to the intelligent device, wherein the first request to obtain data is sent to the server with a first background thread after the intelligent device creates the first background thread during pre-activation operations with a user interface (UI) thread, and wherein the first part of data is used to trigger the intelligent device to write the first part of data to a secure element SE chip in the intelligent device; obtain a second part of data for the card activation performed by the intelligent device; receive from the intelligent device a second request to obtain data; and send a second part of data to the intelligent device, wherein the second request to obtain data is sent with a second background thread after the intelligent device creates the second background thread when the pre-activation operations have been accomplished with the UI thread and it is confirmed to activate the card, and wherein the second part of data is used to trigger the intelligent device to write the second part of data to the SE chip.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of apparatuses and methods consistent with aspects related to the invention as recited in the appended claims.

Figure 1:
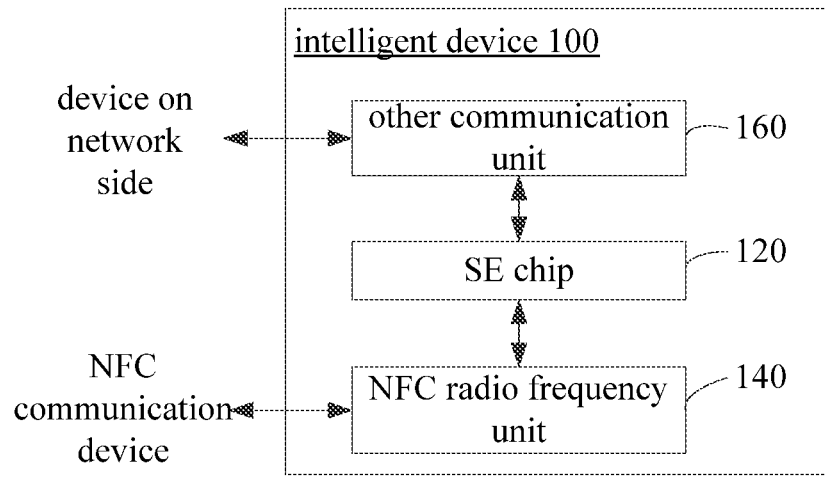
FIG. 1 is a schematic diagram of an intelligent device according to an exemplary embodiment.

FIG. 1 is a schematic diagram of an intelligent device according to an exemplary embodiment. As illustrated in FIG. 1, the intelligent device 100 may include at least a SE chip 120 and a NFC radio frequency unit 140.

To enable an emulation of an entity card, the SE chip 120 is configured to store data which is needed when emulating the entity card. The SE chip 120 has computing capability and can modify the stored data.

The NFC radio frequency unit 140 has radio frequency communication capability and can communicate with outside NFC devices by radio frequency technology.

The SE chip 120 may exchange information with the NFC radio frequency unit 140. The SE chip 120 may send data through the NFC radio frequency unit 140, and the NFC radio frequency unit 140 may send its received data to the SE chip 120. The data can be computed by the SE chip 120 and the SE chip 120 can modify its stored data.

The intelligent device 100 can also include other communication unit 160. The other communication unit 160 may communicate with a network-side device (e.g. a server). The SE chip 120 may interact with the network-side device through the other communication unit 160.

When the intelligent device 100 is used to emulate a NFC card (e.g. a transport card or a credit card), the intelligent device 100 generally has the SE chip 120 and the NFC radio frequency unit 140. The SE chip 120 is used to store data which is needed when emulating the entity card. The NFC radio frequency unit 140 combines with the SE chip 120 to achieve a function of the NFC card. The intelligent device 100 which has the above-mentioned SE chip 120 and the NFC radio frequency unit 140 can also be referred to as a NFC device.

The following embodiments are all based on the intelligent device of FIG. 1 to achieve a card activation function.

Figure 2:
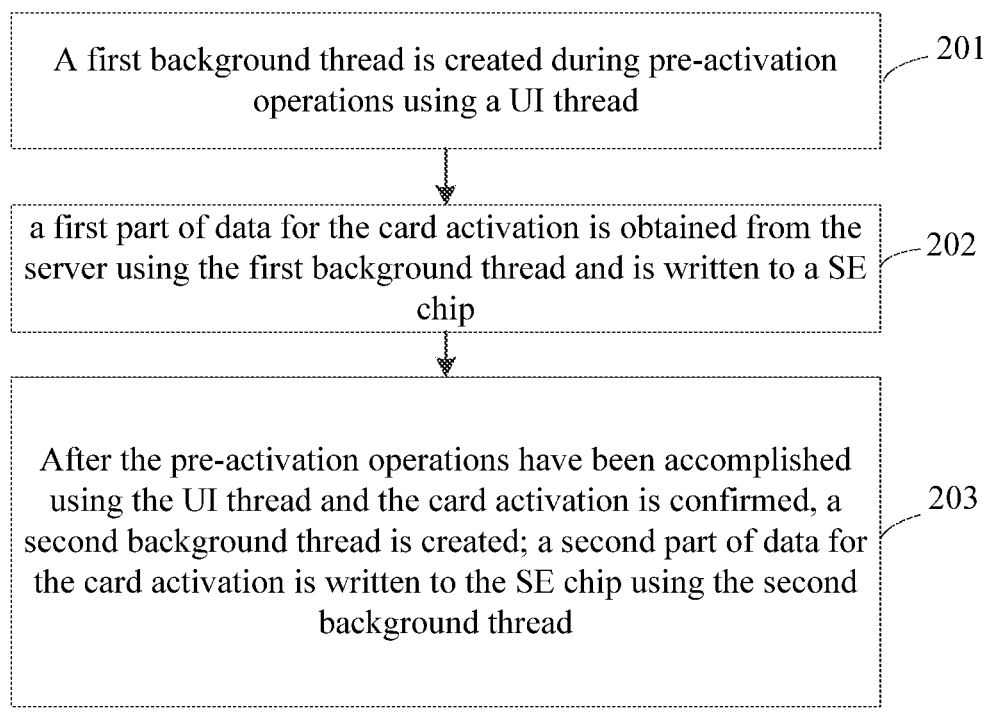
FIG. 2 is a flow chart illustrating a method for card activation according to an exemplary embodiment.

FIG. 2 is a flow chart illustrating a method for card activation according to an exemplary embodiment. As illustrated in FIG. 2, the method for card activation can be applied to the intelligent device 100 of FIG. 1, which may include the following steps.

In step 201, a first background thread is created during pre-activation operations with a UI thread.

The UI thread is a thread used to perform the pre-activation operations. Generally, the UI thread is used to display a page of the corresponding operations associated with the card activation before the card activation process, perform the corresponding operations of the page, and so on.

In practice, the intelligent device may install an application associated with an instantiated NFC card and create the UI thread with the application. The UI thread can interact with a server to obtain a page which is to be displayed in the card activation process and perform the corresponding operations provided on the page.

For example, in the card activation process, the common page associated with the card activation may include a page for displaying terms of service associated with the card activation, a page for inputting personal data associated with the card activation and the like. The page may have an input box which can guide a user to input the personal data, a control which can guide the user to confirm or cancel inputting the personal data and the like.

In step 202, a first part of data for the card activation is obtained from the server using the first background thread and is written to a SE chip.

In step 203, after the pre-activation operations have been accomplished with the UI thread and it is confirmed to activate the card, a second background thread is created. A second part of data for the card activation is written to the SE chip with the second background thread. The first part of data and the second part of data which are associated with the card activation are required to be written to the SE chip.

The first part of data is the data provided from the server which is required to be written to the SE chip in the card activation. The first part of data generally is pre-loaded data for the card activation. The first part of data generally will not change due to the operations of the UI thread.

The second part of data is the data which is required to be written to the SE chip in the card activation. The second part of data may change due to the operations of the UI thread.

In conclusion, a method for card activation is provided in the embodiments of the disclosure. In the method, during the pre-activation operations with the UI thread, part of data for the card activation is written to the SE chip with the created first background thread. Therefore, during the pre-activation operations with the UI thread, the part of data associated with the card activation has been written to the SE chip. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

Figure 3A:
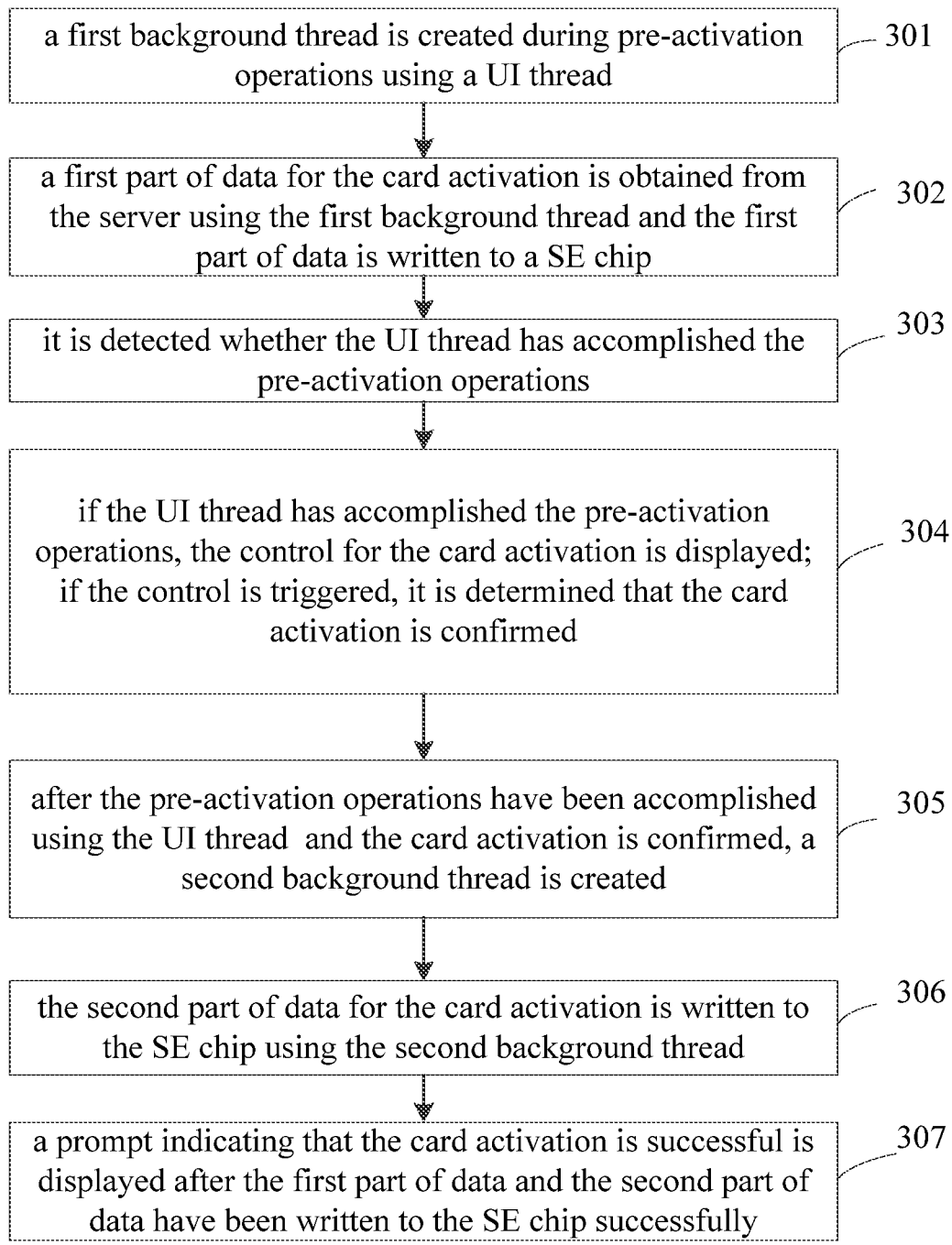
FIG. 3A is a flow chart illustrating a method for card activation according to another exemplary embodiment.

FIG. 3A is a flow chart illustrating a method for card activation according to another exemplary embodiment. As illustrated in FIG. 3A, the method for card activation can be applied in the intelligent device 100 of FIG. 1, which may include the following steps.

In step 301, a first background thread is created during pre-activation operations using a UI thread.

The UI thread is a thread used to perform the pre-activation operations. Generally, the UI thread is used to display a page of the corresponding operations associated with the card activation before the card activation process, perform the corresponding operations of the page, and so on.

In practice, the intelligent device may install an application associated with an instantiated NFC card and create the UI thread with the application. The UI thread may interact with a server to obtain a page which is to be displayed in the card activation process and perform the corresponding operations provided on the page.

For example, in the card activation process, the common page associated with the card activation may include a page for displaying terms of service associated with the card activation, a page for inputting personal data associated with the card activation and the like. The page may have an input box which guides a user to input the personal data, a control which guides the user to confirm or cancel inputting the personal data and the like.

In some embodiments, during the pre-activation operations using the UI thread, the first background thread may be created if the UI thread receives an instruction which indicates that the card activation is allowed.

The instruction generally means that the user allows to activate a card. In this situation, the UI thread may continue to perform the pre-activation operations. In other words, the instruction means that the user wants to perform the pre-activation operations using the UI thread.

For example, in a typical card activation process, the UI thread may display the terms of service associated with the card activation which are obtained from the server. If the user agrees with the terms of service, it is determined that the UI thread receives the instruction which indicates that the card activation is allowed, then the first background thread can be created.

For example, in another typical card activation process, the UI thread may display a prompt to ask the user whether he/she wants to activate the card. If the user confirms to activate the card, it is determined that the UI thread receives the instruction which indicates that the card activation is allowed, then the first background thread may be created.

The first background thread generally does not relate to display and operations of a UI interface. The first background thread may operate in parallel or in serial with the UI thread. If the first background thread operates in serial with the UI thread, the first background thread may operate in the interval during which the UI thread does not operate since the UI thread may suspend, for example to wait input of the user. However, the first background thread can be considered to operate in parallel with the UI thread on the whole. That is, the first background thread can operate with the UI thread at the same time.

In step 302, a first part of data for the card activation is obtained from the server using the first background thread and the first part of data is written to a SE chip.

The first part of data is the data provided from the server which is required to be written to the SE chip in the card activation. The first part of data generally is pre-loaded data for the card activation. The first part of data generally will not change with the operations of the UI thread.

That is, the first part of data is not related to the personal data. In order to identify the instantiated NFC, data associated with user information is required to be written to the SE chip, so that the NFC card can have a unique identity. Such data is generally referred to as the personal data, i.e. a second part of data discussed below.

The second part of data is the data associated with the user information which is required to be written to the SE chip in the card activation. The second part of data may change with the operations of the UI thread. Because in the operations performed by the UI thread before the card activation, different users may input different personal data (such as telephone number, identity, and recharge amount) in the operations of the UI thread, the data the UI thread receives from the different users may be totally or partially different. Therefore, such data may depend on the operations of the UI thread.

In some embodiments, the personal data may also include data assigned by the server for the card activation which uniquely identifies the user.

In some embodiments, the first part of data may include data interacting with a NFC radio frequency unit and may also include data for modifying the personal data in the SE chip.

The data required to be written to the SE chip in the card activation can be divided into the first part of data and the second part of data, in which the first part of data is non-personal data and the second part of data is the personal data.

The first background thread may write the first part of data to the SE chip in a predefined way. The path to write the first part of data to the SE chip may also be predefined.

It may take certain amount of time for the UI thread to guide the user to input the personal data in the card activation and this amount of time is necessary in the card activation process. By writing the first part of data to the SE chip using the first background thread during the operations of the UI thread, it will save time for the user to wait to write the first part of data to the SE chip in later process of the card activation.

In step 303, it is detected whether the UI thread has accomplished the corresponding operations before the card activation.

Generally, when the application performs the pre-activation operations using the UI thread, the corresponding operations are known, thus it can be determined whether the UI thread has accomplished the pre-activation operations, i.e., whether the UI thread has a condition of displaying the control for the card activation, in order to facilitate the user to confirm to activate the card with the control for the card activation.

In step 304, if the UI thread has accomplished the pre-activation operations, the control for the card activation is displayed. If the control is triggered, it is determined that the UI thread has accomplished the pre-activation operations and it is confirmed to activate the card.

Generally, if the UI thread has accomplished the pre-activation operations, the displayed control allows operation or allows response to the operation. In this situation, the user can trigger the control. If the user triggers the control, the UI thread can learn that the control has been triggered.

If the UI thread has not accomplished the pre-activation operations, the displayed control prohibits operation or prohibits response to the operation. For example, the displayed control may be in grey color. In this situation, even though the user triggers the control, the UI thread will not respond to the trigger.

The displayed control for the card activation discussed below is the control that allows operation or allows response to the operation.

If the user triggers the control, it means the user will not modify the data input to the related interface in the UI thread. Therefore, it can be determined that it is confirmed to activate the card.

In step 305, after the pre-activation operations have been accomplished with the UI thread and it is confirmed to activate the card, a second background thread is created.

After the pre-activation operations have been accomplished with the UI thread and it is confirmed to activate the card, it usually means that the user will not modify the personal data. In this situation, the second background thread can be created to write the personal data to the SE chip.

Figure 3B:
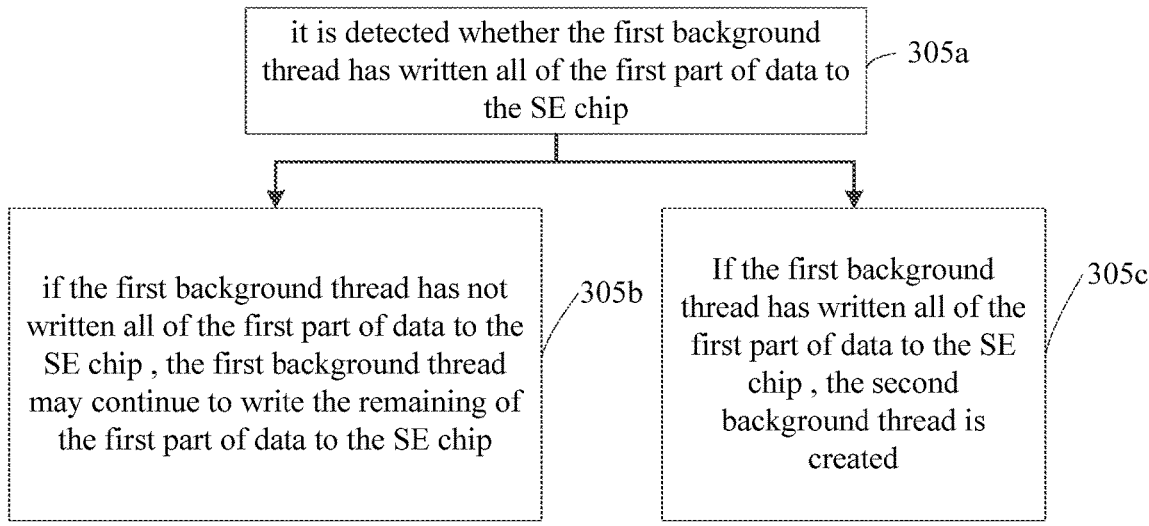
FIG. 3B is a flow chart for creating a second background thread according to an exemplary embodiment.

However, since the created first background thread writes the first part of data the SE chip, there may occur data writing errors if the first part of data has not accomplished to write to the SE chip and the first background thread and the second background thread write data to the SE chip at the same time. To prevent such data writing errors, the intelligent device may create the second background thread with the application in accordance with the steps shown in FIG. 3B.

In step 305a, it is detected whether all the first part of data has been written to the SE chip by the first background thread.

Generally, if all the first part of data has been written to the SE chip by the first background thread, the application may release the first background thread.

If the first background thread has not been released, it can be determined that not all the first part of data has been written to the SE chip by the first background thread; if the first background thread has been released, it can be determined that all the first part of data has been written to the SE chip by the first background thread.

In step 305b, if not all the first part of data has been written to the SE chip by the first background thread, the first background thread may continue to write the remaining of the first part of data to the SE chip. After all the first part of data has been written to the SE chip, the second background thread is created.

If not all the first part of data has been written to the SE chip by the first background thread, the first background thread may continue to write the remaining of the first part of data to the SE chip until the first background thread is released. If the first background thread is released, the second background thread can be created.

In step 305c, if all the first part of data has been written to the SE chip by the first background thread, the second background thread is created.

Alternatively, if the first background thread writes the first part of data to a first path of the SE chip, and the second background thread has writes the second part of data to a second path of the SE chip (the second path is different from the first path), there will not be data writing errors. In this situation, it is not necessary to create the second background thread until the first background thread has been released.

In step 306, the second part of data for the card activation is written to the SE chip with the second background thread.

The second part of data for the card activation is generally obtained during the corresponding operations with the UI thread.

In some embodiments, the second part of data can be obtained during the corresponding operations with the UI thread and synchronized to the server. In this situation, the second background thread may pull the second part of data from the server.

For example, after the second part of data obtained by the UI thread is synchronized to the server, the server checks the second part of data. If the check is passed, the server may store the second part of data and bind the second part of data with the first part of data. The second background thread sends to the server a request to obtain the second part of data. The server feeds back the second part of data which has passed the check. The second background thread writes the second part of data obtained from the server to the SE chip.

The second background thread may write the second part of data to the SE chip in a predefined way. The path to write the second part of data to the SE chip may also be predefined.

In step 307, a prompt indicating that the card activation is successful is displayed after the first part of data and the second part of data have been written to the SE chip successfully.

The prompt may inform the user that the card activation is successful. The user may use the NFC device instead of an entity card.

After the card activation is successful, the NFC device may use the NFC radio frequency unit to communicate with a NFC receiver and modify the data in the SE chip with the communicated information.

Taking the NFC device emulating a transport card as an example, the SE chip in the NFC device includes data indicating remaining amount of money. When the NFC device is close to a transport expense deductor, the NFC radio frequency unit of the NFC device may learn a resource value which is required to be deducted by the transport expense deductor. The NFC radio frequency unit may inform the NFC device to modify the data indicating the remaining amount of money and reduce the data by the resource value.

Figure 3C:
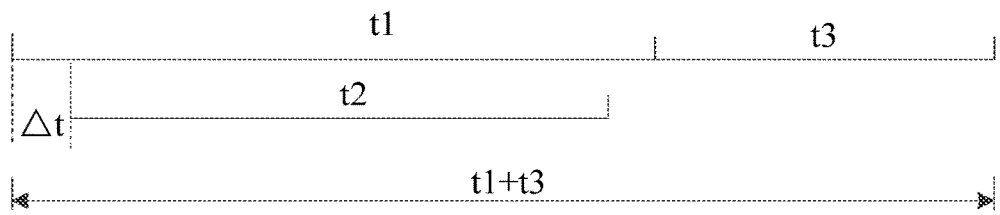
FIGS. 3C and 3D are diagrams illustrating time taking by two kinds of card activation according to an exemplary embodiment.

In the above-mentioned card activation process, if time for the first background thread to write the first part of data is shorter than time for the UI thread to perform the pre-activation operations, and the first background thread is created a predefined time $\Delta t$ after the UI thread is created, the total time taken by the card activation is the time for the UI thread to perform the pre-activation operations and the time for the second background thread to write the second part of data. As shown in FIG. 3C, t1 is the time for the UI thread to perform the pre-activation operations, and t2 is the time for the first background thread to write the first part of data (t2<t1). The first background thread is created a predefined time $\Delta t$ after the UI thread is created, and t3 is the time for the second background thread to write the second part of data. The total time taken by the card activation is t1+t3.

Figure 3D:
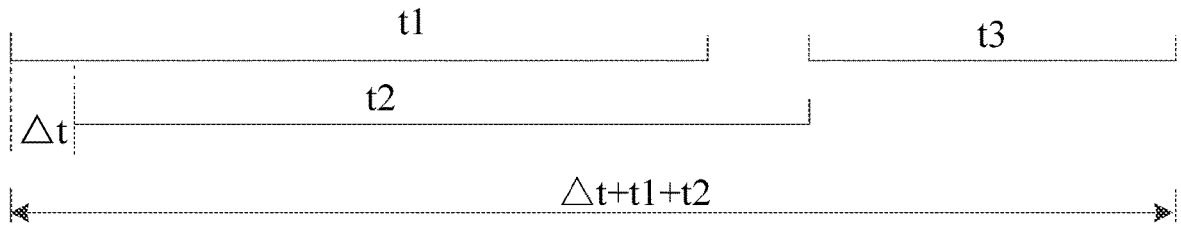

If the time for the first background thread to write the first part of data is longer than the time for the UI thread to perform the pre-activation operations, and the first background thread is created a predefined time $\Delta t$ after the UI thread is created, the total time taken by the card activation is the time for the first background thread to write the first part of data and the time for the second background thread to write the second part of data. As shown in FIG. 3D, t1 is the time for the UI thread to perform the pre-activation operations, and t2 is the time for the first background thread to write the first part of data (t2>t1). The first background thread is created a predefined time $\Delta t$ after the UI thread is created, and t3 is the time for the second background thread to write the second part of data. The total time taken by the card activation is $\Delta t+t2+t3$ ($\Delta t<t1$).

Whether in FIG. 3C or 3D, the total time taken by the card activation is shorter than the total time taken by a general card activation, i.e. t1+t2+t3.

In conclusion, a method for card activation is provided in the embodiment of the disclosure. In the method, during the pre-activation operations with the UI thread, part of data for the card activation is written to the SE chip with the created first background thread. Therefore, during the pre-activation operations with the UI thread, the part of data associated with the card activation has been written to the SE chip. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

In addition, because the pre-activation operations with the UI thread are complex and varied, the first background thread may be created when the UI thread receives the instruction which indicates that the card activation is allowed, in order to write the data for the card activation to the SE chip as early as possible. Therefore, the data may be written to the SE chip as early as possible during the pre-activation operations with the UI thread, thus reducing the time taking by the card activation.

By creating the second background thread after determining all the first part of data has been written to the SE chip by the first background thread, it avoids the data writing errors which may occur when the two threads write data to the SE chip simultaneously.

To avoid missing an operation during the pre-activation operations, it may display the control for the card activation after determining the UI thread has accomplished the pre-activation operations, in order to perform the operations of writing the remaining data to the SE chip.

In practice, because the intelligent device writes the first part of data with the first background thread and writes the second part of data with the second background thread, the server may modify the first part of data and the second part of data. The operation processes of the intelligent device and the server in the card activation process are described in the steps of FIG. 4.

Figure 4:
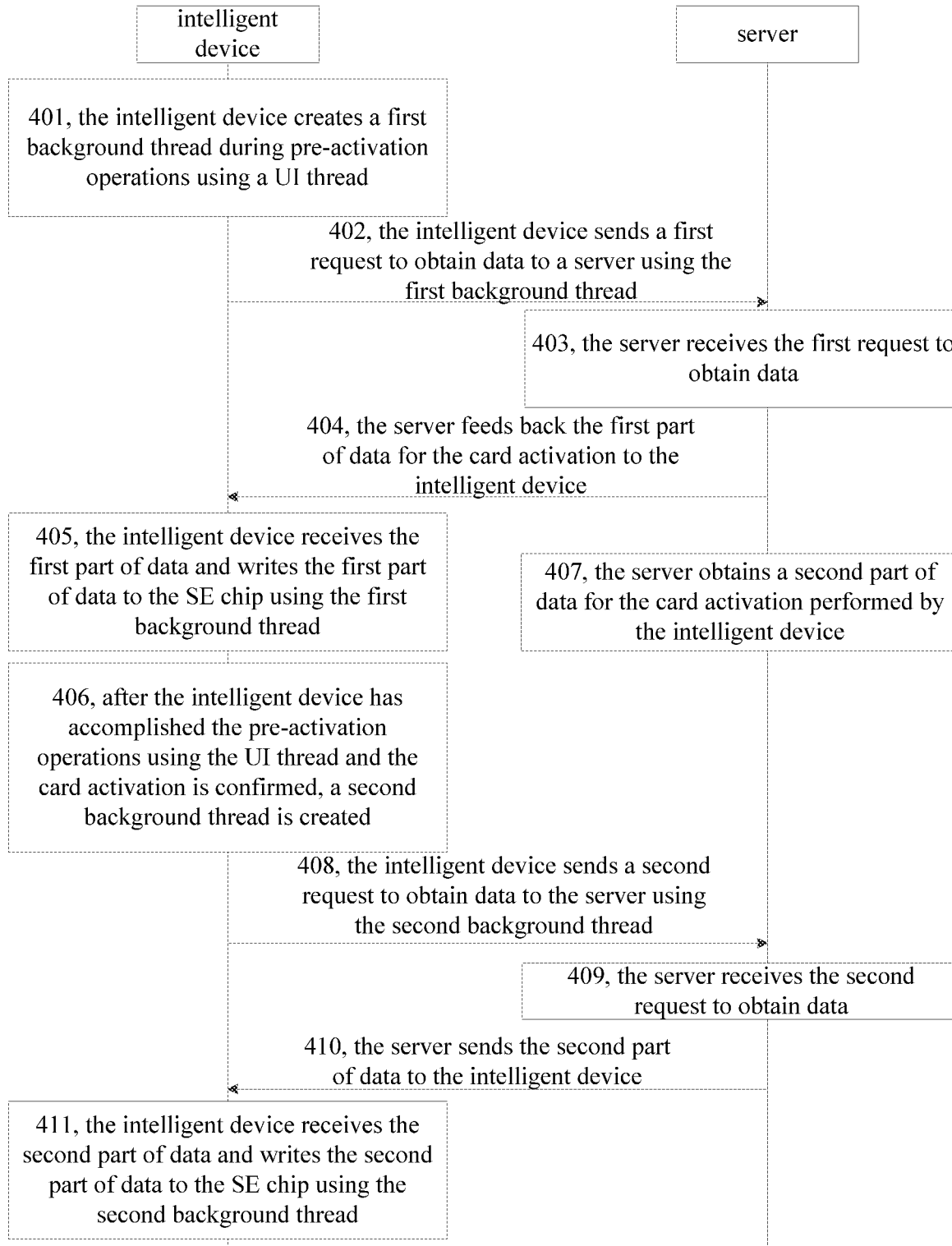
FIG. 4 is a flow chart illustrating a method for card activation according to another exemplary embodiment.

FIG. 4 is a flow chart illustrating a method for card activation according to another exemplary embodiment. The method for card activation may include the following steps.

In step 401, an intelligent device creates a first background thread during pre-activation operations with a UI thread.

The step 401 is similar as the step 301. The details of the step 401 can reference to the step 301, which will not be described here.

In step 402, the intelligent device sends a first request to obtain data to a server with the first background thread.

After the intelligent device creates the first background thread, the intelligent device may send the first request to obtain data to the server with the first background thread, so as to obtain a first part of data associated with the card activation.

In step 403, the server receives the first request to obtain data.

After the intelligent device sends the first request to obtain data to the server, the server may receive the first request to obtain data correspondingly.

In step 404, the server feeds back the first part of data for the card activation to the intelligent device.

After the server receives the first request to obtain data sent by the intelligent device, the server may feed back the first part of data for the card activation to the intelligent device. The explanation of the first part of data can reference to those described in the step 302.

In step 405, the intelligent device receives the first part of data and writes the first part of data to the SE chip with the first background thread.

The step 405 is similar as the step 302. The details of the step 405 can reference to the step 302, which will not be described here.

In step 406, after the intelligent device has accomplished the pre-activation operations with the UI thread and it is confirmed to activate the card, a second background thread is created.

The step 406 can be achieved by the steps 303-305 or by the step 305. The details of the step 406 can reference to the steps 303-305, which will not be described here.

In step 407, the server obtains a second part of data for the card activation performed by the intelligent device.

When the server obtains the second part of data for the card activation, the server may receive a third part of data sent by the intelligent device. The third part of data is generated by the intelligent device with the UI thread. The second part of data is generated according to a predefined rule of the card activation and the third part of data.

Generally, the UI thread may inform a user to input personal data and verification information associated with the card activation. The personal data and verification information may be sent to the server as the third part of data. For example, the server may verify based on the verification information. If the verification is successful, the server may generate the second part of data according to the predefined rule of the card activation and the third part of data. Generally, the second part of data is the personal data of the user in the card activation. The personal data herein includes not only the personal data input by the user according to the UI thread, but also the personal data generated for the user by the server.

In step 408, the intelligent device sends a second request to obtain data to the server with the second background thread.

Because the first background thread only pulls the first part of data from the server, the intelligent device need to send the second request to obtain data to the server with the second background thread when the intelligent device need to obtain the second part of data.

In step 409, the server receives the second request to obtain data.

After the intelligent device sends the second request to obtain data to the server, the server may receive the second request to obtain data correspondingly.

In step 410, the server sends the second part of data to the intelligent device.

After the server receives the second request to obtain data, the server may feed back the second part of data for the card activation to the intelligent device.

In step 411, the intelligent device receives the second part of data and writes the second part of data to the SE chip with the second background thread.

The step 411 is similar as the step 306. The details of the step 411 can reference to the step 306, which will not be described here.

In conclusion, a method for card activation is provided in the embodiments of the disclosure. In the method, during the pre-activation operations with the UI thread, part of data for the card activation is written to the SE chip with the created first background thread. Therefore, during the pre-activation operations with the UI thread, the part of data associated with the card activation has been written to the SE chip. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

In practice, the steps 401, 402, 405, 406, 408 and 411 may achieve the method for card activation on the side of the intelligent device; the steps 403, 404, 407, 409 and 410 may achieve the method for card activation on the side of the server.

Below is an embodiment of an apparatus of the disclosure, which can perform the embodiment of the method of the disclosure. The details not shown in the embodiment of the apparatus of the disclosure can reference to the embodiment of the method of the disclosure.

Figure 5A:
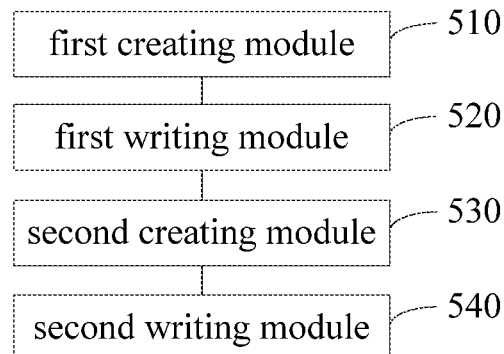
FIG. 5A is a block diagram illustrating an apparatus for card activation according to an exemplary embodiment.

FIG. 5A is a block diagram illustrating an apparatus for card activation according to an exemplary embodiment. As illustrated in FIG. 5A, the apparatus for card activation can be applied to the intelligent device 100 of FIG. 1, which may include but not limited to: a first creating module 510, a first writing module 520, a second creating module 530, and a second writing module 540.

The first creating module 510 is configured to create a first background thread during pre-activation operations with a UI thread.

The UI thread is a thread used to perform the pre-activation operations. Generally, the UI thread is used to display a page of the corresponding operations associated with the card activation before the card activation process, perform the corresponding operations of the page, and so on.

In practice, the intelligent device may install an application associated with an instantiated NFC card and create the UI thread with the application. The UI thread can interact with a server to obtain a page which is to be displayed in the card activation process and perform the corresponding operations provided on the page.

For example, in the card activation process, the common page associated with the card activation may include a page for displaying terms of service associated with the card activation, a page for inputting personal data associated with the card activation and the like. The page may have an input box which can guide a user to input the personal data, a control which can guide the user to confirm or cancel inputting the personal data and the like.

In some embodiments, during the pre-activation operations with the UI thread, the intelligent device creates the first background thread if the UI thread receives an instruction which indicates that the card activation is allowed.

The instruction generally means that the user allows to activate a card. In this situation, the UI thread may continue to perform the pre-activation operations. In other words, the instruction means that the user wants to perform the pre-activation operations with the UI thread.

For example, in a typical card activation process, the UI thread may display the terms of service associated with the card activation which are obtained from the server. If the user agrees with the terms of service, it is determined that the UI thread receives the instruction which indicates that the card activation is allowed, then the first background thread can be created.

For example, in another typical card activation process, the UI thread may display a prompt to ask the user whether he/she wants to activate the card. If the user confirms to activate the card, it is determined that the UI thread receives the instruction which indicates that the card activation is allowed, then the first background thread may be created.

The first background thread generally does not relate to display and operations of a UI interface. The first background thread may operate in parallel or in serial with the UI thread. If the first background thread operates in serial with the UI thread, the first background thread may operate in the interval during which the UI thread does not operate since the UI thread may suspend, for example to wait input of the user. However, the first background thread can be considered to operate in parallel with the UI thread on the whole. That is to say, the first background thread can operate with the UI thread at the same time.

The first writing module 520 is configured to obtain a first part of data for the card activation from the server with the first background thread and write the first part of data to a SE chip.

The first part of data is the data provided from the server which is required to be written to the SE chip in the card activation. The first part of data generally is pre-loaded data for the card activation. The first part of data generally will not change with the operations of the UI thread.

That is, the first part of data is not related to the personal data. In order to identify the instantiated NFC, data associated with user information is required to be written to the SE chip, so that the NFC card can have a unique identity. Such data is generally referred to as the personal data, i.e. a second part of data discussed below.

The second part of data is the data associated with the user information which is required to be written to the SE chip in the card activation. The second part of data may change with the operations of the UI thread. Because in the operations performed by the UI thread before the card activation, different users may input different personal data (such as telephone number, identity, and recharge amount) in the operations of the UI thread, the data the UI thread receives from the different users may be totally or partially different. Therefore, such data may depend on the operations of the UI thread.

In some embodiments, the personal data may also include data assigned by the server for the card activation which uniquely identifies the user.

In some embodiments, the first part of data may include data interacting with a NFC radio frequency unit and may also include data for modifying the personal data in the SE chip.

The data required to be written to the SE chip in the card activation can be divided into the first part of data and the second part of data, in which the first part of data is non-personal data and the second part of data is the personal data.

The first background thread may write the first part of data to the SE chip in a predefined way. The path to write the first part of data to the SE chip may also be predefined.

It may take certain amount of time for the UI thread to guide the user to input the personal data in the card activation and this amount of time is necessary in the card activation process. By writing the first part of data to the SE chip with the first background thread during the operations of the UI thread, it will save time for the user to wait to write the first part of data to the SE chip in later process of the card activation.

The second creating module 530 is configured to create a second background thread after the pre-activation operations have been accomplished with the UI thread and it is confirmed to activate the card.

After the pre-activation operations have been accomplished with the UI thread and it is confirmed to activate the card, it usually means that the user will not modify the personal data. In this situation, the second background thread can be created to write the personal data to the SE chip.

The second writing module 540 is configured to write the second part of data for the card activation to the SE chip by the second background thread created by the second creating module 530. The first part of data and the second part of data are the data associated with the card activation which is required to be written to the SE chip.

The second part of data for the card activation is generally obtained during the corresponding operations with the UI thread.

In some embodiments, the second part of data can be obtained during the corresponding operations with the UI thread and synchronized to the server. In this situation, the second background thread may pull the second part of data from the server.

For example, after the second part of data obtained by the UI thread is synchronized to the server, the server checks the second part of data. If the check is passed, the server may store the second part of data and bind the second part of data with the first part of data. The second background thread sends to the server a request to obtain the second part of data. The server feeds back the second part of data which has passed the check. The second background thread writes the second part of data obtained from the server to the SE chip.

The second background thread may write the second part of data to the SE chip in a predefined way. The path to write the second part of data to the SE chip may also be predefined.

In an embodiment, the first creating module 510 may also be configured to create the first background thread if the UI thread receives an instruction which indicates that the card activation is allowed during the pre-activation operations with the UI thread.

Figure 5B:
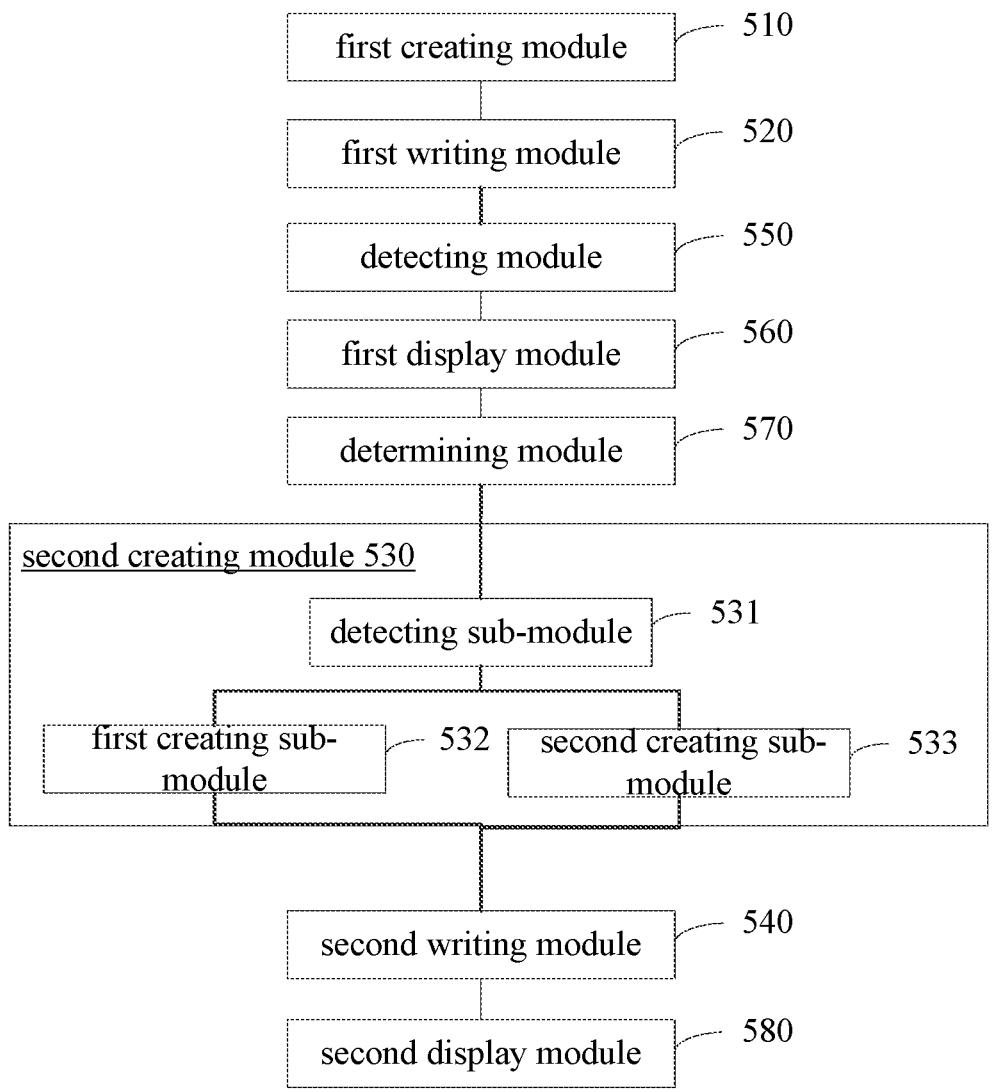
FIG. 5B is a block diagram illustrating an apparatus for card activation according to another exemplary embodiment.

In another embodiment, since the created first background thread writes the first part of data the SE chip, there may occur data writing errors if the first part of data has not accomplished to write to the SE chip and the first background thread and the second background thread write data to the SE chip at the same time. To prevent such data writing errors, the second creating module 530 may include: a detecting sub-module 531, a first creating sub-module 532 and a second creating sub-module 533, as shown in FIG. 5B.

The detecting sub-module 531 is configured to detect whether all the first part of data has been written to the SE chip by the first background thread.

Generally, if all the first part of data has been written to the SE chip by the first background thread, the application may release the first background thread.

If the first background thread has not been released, it can be determined that not all the first part of data has been written to the SE chip by the first background thread; if the first background thread has been released, it can be determined that all the first part of data has been written to the SE chip by the first background thread.

The first creating sub-module 532 is configured to wait the first background thread to continue to write the remaining of the first part of data to the SE chip if the detecting sub-module 531 detects that not all the first part of data has been written to the SE chip by the first background thread and create the second background thread after all the first part of data has been written to the SE chip.

If not all the first part of data has been written to the SE chip by the first background thread, the first background thread may continue to write the remaining of the first part of data to the SE chip until the first background thread is released. If the first background thread is released, the second background thread can be created.

The second creating sub-module 533 is configured to create the second background thread if the detecting sub-module 531 detects that all the first part of data has been written to the SE chip by the first background thread.

Alternatively, if the first background thread writes the first part of data to a first path of the SE chip, and the second background thread has writes the second part of data to a second path of the SE chip (the second path is different from the first path), there will not be data writing errors. In this situation, it is not necessary to create the second background thread until the first background thread has been released.

In another embodiment, the apparatus for card activation may also include: a detecting module 550, a first display module 560 and a determining module 570, as shown in FIG. 5B.

The detecting module 550 is configured to detect whether the UI thread has accomplished the pre-activation operations.

Generally, when the application performs the pre-activation operations with the UI thread, the corresponding operations are known, thus it can be determined whether the UI thread has accomplished the pre-activation operations, i.e., whether the UI thread has a condition of displaying the control for the card activation, in order to facilitate the user to confirm to activate the card with the control for the card activation.

The first display module 560 is configured to display the control for the card activation if the detecting module 550 detects that the UI thread has accomplished the pre-activation operations.

The determining module 570 is configured to determine that the UI thread has accomplished the pre-activation operations and it is confirmed to activate the card if the control displayed by the first display module 560 is triggered.

Generally, if the UI thread has accomplished the pre-activation operations, the displayed control allows operation or allows response to the operation. In this situation, the user can trigger the control. If the user triggers the control, the UI thread can learn that the control has been triggered.

If the UI thread has not accomplished the pre-activation operations, the displayed control prohibits operation or prohibits response to the operation. For example, the displayed control may be in grey color. In this situation, even though the user triggers the control, the UI thread will not respond to the trigger.

The displayed control for the card activation discussed below is the control that allows operation or allows response to the operation.

If the user triggers the control, it means the user will not modify the data input to the related interface in the UI thread. Therefore, it can be determined that it is confirmed to activate the card.

In another embodiment, the apparatus for card activation may also include a second display module 580, as shown in FIG. 5B.

The second display module 580 is configured to display a prompt indicating that the card activation is successful after the first part of data and the second part of data have been written to the SE chip successfully.

The prompt may inform the user that the card activation is successful. The user may use the NFC device instead of an entity card.

After the card activation is successful, the NFC device may use the NFC radio frequency unit to communicate with a NFC receiver and modify the data in the SE chip with the communicated information.

Taking the NFC device emulating a transport card as an example, the SE chip in the NFC device includes data indicating remaining amount of money. When the NFC device is close to a transport expense deductor, the NFC radio frequency unit of the NFC device may learn a resource value which is required to be deducted by the transport expense deductor. The NFC radio frequency unit may inform the NFC device to modify the data indicating the remaining amount of money and reduce the data by the resource value.

In conclusion, an apparatus for card activation is provided in the embodiments of the disclosure. In the apparatus, during the pre-activation operations with the UI thread, part of data for the card activation is written to the SE chip with the created first background thread. Therefore, during the pre-activation operations with the UI thread, the part of data associated with the card activation has been written to the SE chip. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

In addition, because the pre-activation operations with the UI thread are complex and varied, the first background thread may be created when the UI thread receives the instruction which indicates that the card activation is allowed, in order to write the data for the card activation to the SE chip as early as possible. Therefore, the data may be written to the SE chip as early as possible during the pre-activation operations with the UI thread, thus reducing the time taking by the card activation.

By creating the second background thread after determining all the first part of data has been written to the SE chip by the first background thread, it avoids the data writing errors which may occur when the two threads write data to the SE chip simultaneously.

To avoid missing an operation during the pre-activation operations, it is required to display the control for the card activation after determining the UI thread has accomplished the pre-activation operations, in order to perform the operations of writing the remaining data to the SE chip.

Figure 6A:
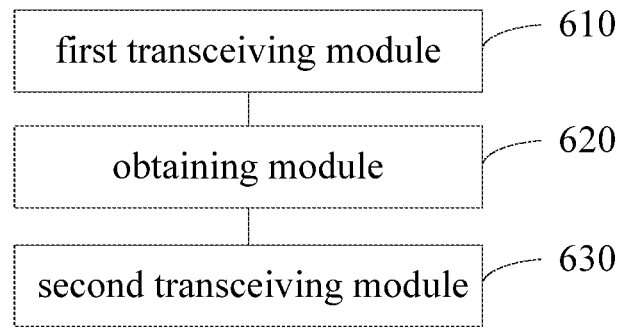
FIG. 6A is a block diagram illustrating an apparatus for card activation according to another exemplary embodiment.

FIG. 6A is a block diagram illustrating an apparatus for card activation according to an exemplary embodiment. As illustrated in FIG. 6A, the apparatus for card activation can be applied to a server, which may include but not limited to: a first transceiving module 610, an obtaining module 620 and a second transceiving module 630.

The first transceiving module 610 is configured to receive a first request to obtain data from an intelligent device and send a first part of data for the card activation to the intelligent device. The first request to obtain data is sent with a first background thread after the intelligent device creates the first background thread during pre-activation operations with a user interface (UI) thread. The first part of data is used to trigger the intelligent device to write the first part of data to a secure element SE chip in the intelligent device.

The obtaining module 620 is configured to obtain a second part of data for the card activation performed by the intelligent device.

The second transceiving module 630 is configured to receive a second request to obtain data from the intelligent device and send a second part of data obtained by the obtaining module 620 to the intelligent device. The second request to obtain data is sent with a second background thread after the intelligent device creates the second background thread when the pre-activation operations have been accomplished with the UI thread and it is confirmed to activate the card. The second part of data is used to trigger the intelligent device to write the second part of data to the SE chip.

Figure 6B:
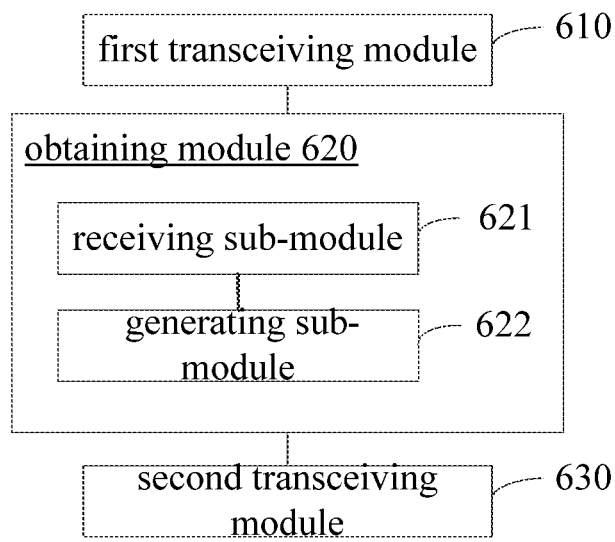
FIG. 6B is a block diagram illustrating an apparatus for card activation according to another exemplary embodiment.

In another embodiment, the obtaining module 620 may include: a receiving sub-module 621 and a generating sub-module 622, as shown in FIG. 6B.

The receiving sub-module 621 is configured to receive a third part of data sent by the intelligent device. The third part of data is generated by the intelligent device with the UI thread.

The generating sub-module 622 is configured to generate the second part of data according to a predefined rule of the card activation and the third part of data received by the receiving sub-module 621.

Generally, the UI thread may inform a user to input personal data and verification information associated with the card activation. The personal data and verification information may be sent to the server as the third part of data. For example, the server may verify based on the verification information. If the verification is successful, the server may generate the second part of data according to the predefined rule of the card activation and the third part of data. Generally, the second part of data is the personal data of the user in the card activation. The personal data herein includes not only the personal data input by the user according to the UI thread, but also the personal data generated for the user by the server.

In another embodiment, the first part of data is non-personal data for the card activation and the second part of data is personal data for the card activation.

In conclusion, an apparatus for card activation is provided in the embodiment of the disclosure. In the apparatus, the first part of data associated with the card activation is sent to the intelligent device when the intelligent device receives from the intelligent device the first request to obtain data. During the pre-activation operations with the UI thread, part of data for the card activation is written to the SE chip by the intelligent device. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

Figure 7:
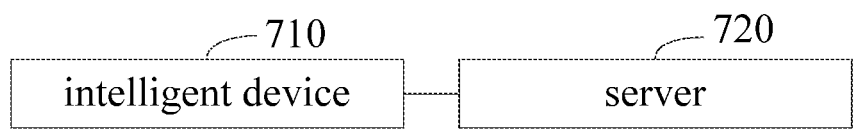
FIG. 7 is a block diagram illustrating a system for card activation according to an exemplary embodiment.

FIG. 7 is a block diagram illustrating a system for card activation according to an exemplary embodiment, which includes an intelligent device 710 and a server 720.

The intelligent device 710 may include the apparatus for card activation shown in FIGS. 5A and 5B. The details of the intelligent device 710 can reference to FIGS. 5A and 5B, which will not be described here.

The server 720 may include the apparatus for card activation shown in FIGS. 6A and 6B. The details of the server 720 can reference to FIGS. 6A and 6B, which will not be described here.

In conclusion, a system for card activation is provided in the embodiment of the disclosure. In the system, during the pre-activation operations with the UI thread, the intelligent device writes part of data for the card activation to the SE chip with the created first background thread. Therefore, during the pre-activation operations with the UI thread, the part of data associated with the card activation has been written to the SE chip. In the last step, it only needs to write the remaining data which has not been written to the SE chip. As a result, it saves time to activate a card, because the part of data associated with the card activation has been written to the SE chip during the pre-activation operations with the UI thread, thus reducing time to activate the card with the NFC device.

Operations of modules in the apparatuses in the embodiments have been described in corresponding method embodiments, which will not described here.

An apparatus for card activation is provides in an exemplary embodiment of the disclosure, which can achieve the method for card activation provided in the disclosure. The apparatus for card activation is applied to the intelligent device 100 of FIG. 1. The apparatus may include: a processor; and a memory for storing instructions executable by the processor; wherein the processor is configured to: create a first background thread during pre-activation operations using a UI thread; obtain a first part of data for the card activation from a server using the first background thread; write the first part of data to the SE chip using the first background thread; create a second background thread after the pre-activation operations have been accomplished using the UI thread and the card activation is confirmed; and write a second part of data for the card activation to the SE chip using the second background thread.

An apparatus for card activation is provides in an exemplary embodiment of the disclosure, which can achieve the method for card activation provided in the disclosure. The apparatus for card activation is applied to a server. The apparatus may include: a processor; and a memory for storing instructions executable by the processor; wherein the processor is configured to: receive from an intelligent device a first request to obtain data; send a first part of data for the card activation to the intelligent device, wherein the first request to obtain data is sent to the server with a first background thread after the intelligent device creates the first background thread during pre-activation operations with a user interface (UI) thread, and wherein the first part of data is used to trigger the intelligent device to write the first part of data to a secure element SE chip in the intelligent device; obtain a second part of data for the card activation performed by the intelligent device; receive from the intelligent device a second request to obtain data; and send a second part of data to the intelligent device, wherein the second request to obtain data is sent with a second background thread after the intelligent device creates the second background thread when the pre-activation operations have been accomplished with the UI thread and it is confirmed to activate the card, and wherein the second part of data is used to trigger the intelligent device to write the second part of data to the SE chip.

Figure 8:
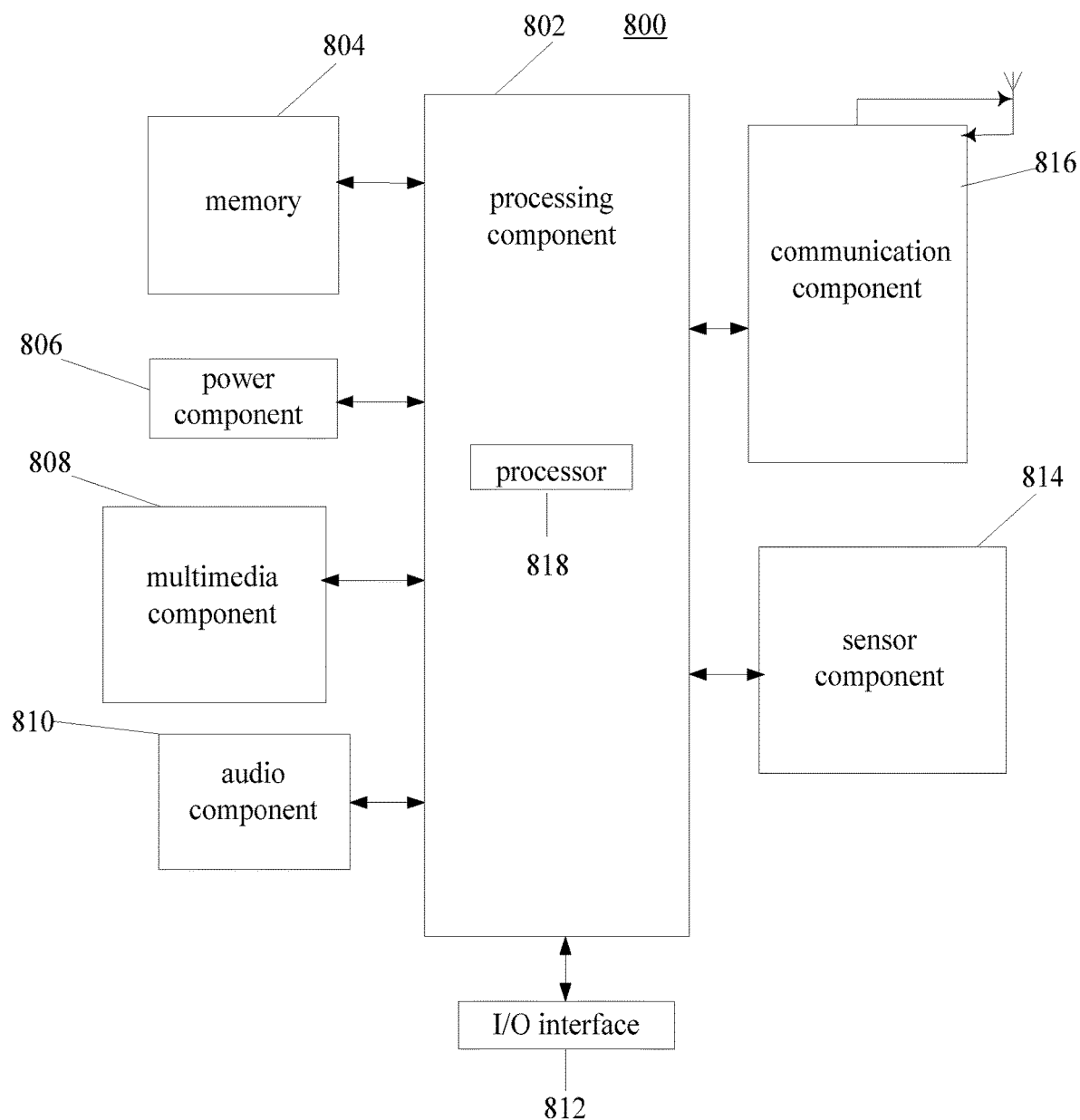
FIG. 8 is a block diagram illustrating an apparatus for card activation according to another exemplary embodiment.

FIG. 8 is a block diagram of an apparatus for card activation according to an exemplary embodiment. For example, the apparatus 800 may be an intelligent device having a SE chip, such as a mobile phone, a computer, a digital broadcast terminal, a messaging device, a gaming console, a tablet, a medical device, exercise equipment, a personal digital assistant, and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 818 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power for the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have optical focusing and zooming capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, the peripheral interface modules being, for example, a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components (e.g., the display and the keypad, of the apparatus 800), a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of a nearby object without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2Q or 3Q or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies. Accordingly, the apparatus 800 may also include the SE chip (not shown). The SE chip is connected with the a NFC module and communicates with an outer device through the NFC module. The SE chip may aslo communicate with a device on the network side through a communication device with other communication ways (such as Wi-Fi, 2G and 3G) in the communication component 816.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 818 in the apparatus 800, for performing the above-described methods. For example, the non-transitory computer-readable storage medium may be a ROM, a RAM, a CD-ROM, a magnetic tape, a floppy disc, an optical data storage device, and the like.

Figure 9:
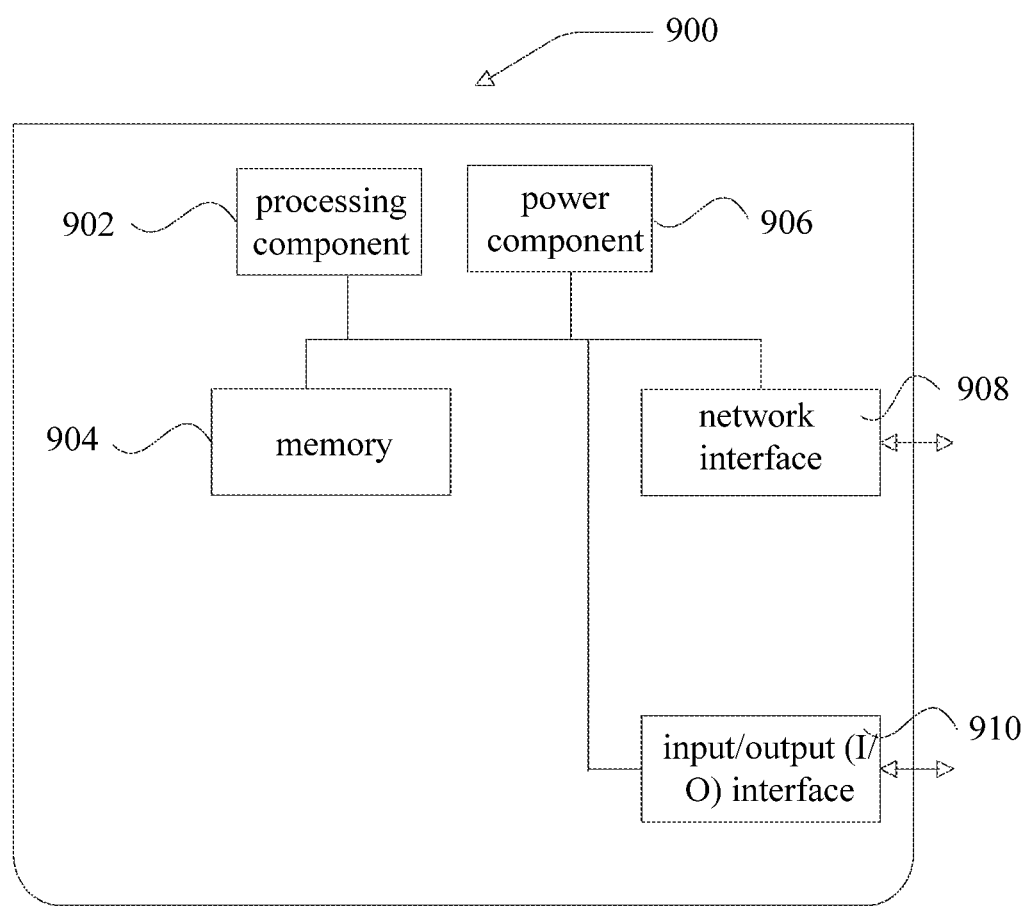
FIG. 9 is a block diagram illustrating an apparatus for card activation according to another exemplary embodiment.

FIG. 9 is a block diagram of an apparatus for card activation according to another exemplary embodiment. For example, the apparatus 900 may be provided as a device on network side, such as a server. Referring to FIG. 9, the apparatus 900 includes a processing component 902 which may include one or more processors, and memory 904 for storing instructions which can be executed by the processing component 902, such as an application. The application stored in the memory 904 may include one or more modules each corresponding to a set of instructions. In addition, the processing component 902 is configured to execute the instructions to perform the method for card activation.

The apparatus 900 may also include a power component 906 configured to perform power management of the apparatus 900, a wired or wireless network interface 908 configured to connect the apparatus 900 to the network, and an input/output (I/O) interface 910. The apparatus 900 may operate based on an operation system stored on the memory 904, such as Windows Server™, Mac OS X™, Unix™, Linux™, FreeBSD™ and the like.

Other embodiments will be apparent to those skilled in the art from consideration of the specification and practice of the disclosures herein. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for card activation, applied to an intelligent device having a secure element (SE) chip, the method comprising:
   receiving, by a user interface (UI) thread, an allowance instruction input by a user indicating that the card activation is allowed, during pre-activation operations that are performed with the UI thread before the card activation;
   creating a first background thread based on the allowance instruction;
   obtaining a first part of data for the card activation from a server using the first background thread, wherein the first part of data is non-personal data for the card activation;
   writing the first part of data to the SE chip using the first background thread;
   receiving, by the UI thread, a confirmation instruction input by the user indicating that the card activation is confirmed after the pre-activation operations have been accomplished with the UI thread;
   creating a second background thread based on the confirmation instruction; and
   writing a second part of data for the card activation to the SE chip using the second background thread, wherein the second part of data is personal data for the card activation.

2. The method of claim 1, wherein creating the second background thread comprises:
   detecting whether the first background thread has written all of the first part of data to the SE chip;
   continuing to write the remaining of the first part of data to the SE chip using the first background thread if the first background thread has not written all of the first part of data to the SE chip.

3. The method of claim 1, wherein creating the second background thread comprises:
   detecting whether the first background thread writes all of the first part of data to the SE chip;
   creating the second background thread if the first background thread has written all of the first part of data to the SE chip.

4. The method of claim 1, further comprising:
   detecting whether the UI thread has accomplished the pre-activation operations;
   displaying a control for the card activation if the UI thread has accomplished the pre-activation operations; and
   determining that the card activation is confirmed if the control is triggered.

5. The method of claim 1, further comprising:
   displaying a prompt indicating that the card activation is successful after the first part of data and the second part of data have been written to the SE chip successfully.

6. An apparatus for card activation, applied to an intelligent device having a SE chip, the apparatus comprising:
   a processor; and
   a memory for storing instructions executable by the processor;
   wherein the processor is configured to:
      receive, by a user interface (UI) thread, an allowance instruction input by a user indicating that the card activation is allowed, during pre-activation operations that are performed with the UI thread before the care activation;

create a first background thread based on the allowance instruction;
obtain a first part of data for the card activation from a server using the first background thread, wherein the first part of data is non-personal data for the card activation;
write the first part of data to the SE chip using the first background thread;
receive, by the UI thread, a confirmation instruction input by the user indicating that the card activation is confirmed after the pre-activation operations have been accomplished with the UI thread; and the card activation is confirmed,
create a second background thread based on the confirmation instruction; and
write a second part of data for the card activation to the SE chip using the second background thread, wherein the second part of data is personal data for the card activation.

7. The apparatus of claim 6, wherein the processor configured to create the second background thread is further configured to:
detect whether the first background thread has written all of the first part of data to the SE chip;
continue to write the remaining of the first part of data to the SE chip using the first background thread if the first background thread has not written all of the first part of data to the SE chip.

8. The apparatus of claim 6, wherein the processor configured to create the second background thread is further configured to:
detect whether the first background thread writes all of the first part of data to the SE chip;
create the second background thread if the first background thread has written all of the first part of data to the SE chip.

9. The apparatus of claim 6, wherein the processor is further configured to:
detect whether the UI thread has accomplished the pre-activation operations;
display a control for the card activation if the UI thread has accomplished the pre-activation operations; and
determine that the card activation is confirmed if the control is triggered.

10. The apparatus of claim 6, wherein the processor is further configured to:
display a prompt indicating that the card activation is successful after the first part of data and the second part of data have been written to the SE chip successfully.

11. An apparatus for card activation, applied to a server, the apparatus comprising:
a processor; and
a memory for storing instructions executable by the processor;
wherein the processor is configured to:
receive from an intelligent device a first request to obtain data;
send a first part of data for the card activation to the intelligent device, wherein the first request to obtain data is sent to the server with a first background thread after the intelligent device creates the first background thread, and wherein the first background thread is created when a user interface (UI) the UI thread receives an allowance instruction from a user indicating that the card activation is allowed during pre-activation operations that are performed with the UI thread before the card activation, wherein the first part of data is non-personal data for the card activation;
obtain a second part of data for the card activation performed by the intelligent device, wherein the second part of data is personal data for the card activation;
receive from the intelligent device a second request to obtain data; and
send the second part of data to the intelligent device, wherein the second request to obtain data is sent with a second background thread after the intelligent device creates the second background thread, and wherein the second background thread is created when the UI thread receives a confirmation instruction from the user indicating that the card activation is confirmed after the pre-activation operations have been accomplished with the UI thread;
wherein the first part of data is used to trigger the intelligent device to write the first part of data to a secure element SE chip in the intelligent device and the second part of data is used to trigger the intelligent device to write the second part of data to the SE chip.

* * * * *